(12) United States Patent
Hamaya et al.

(10) Patent No.: US 8,259,353 B2
(45) Date of Patent: Sep. 4, 2012

(54) IMAGE FORMING APPARATUS

(75) Inventors: Masahito Hamaya, Nagoya (JP);
Tsuyoshi Maruyama, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 725 days.

(21) Appl. No.: 12/426,977

(22) Filed: Apr. 21, 2009

(65) Prior Publication Data

US 2009/0262374 A1    Oct. 22, 2009

(30) Foreign Application Priority Data

Apr. 22, 2008  (JP) ................................ 2008-111548

(51) Int. Cl.
*H04N 1/60* (2006.01)

(52) U.S. Cl. .......... 358/1.9; 358/1.3; 358/526; 399/101; 399/123; 399/143; 399/313; 399/354; 347/111

(58) Field of Classification Search ............ 358/1.3–1.9, 358/1.12, 1.18, 526; 347/111, 112; 399/100, 399/101, 116, 123, 129, 143, 149, 162, 164, 399/176, 239, 240, 245, 249, 264, 279, 283, 399/284, 286, 310, 313, 314, 327, 343, 349, 399/350, 354, 357, 358
See application file for complete search history.

(56) References Cited

U.S. PATENT DOCUMENTS

| | | | |
|---|---|---|---|
| 6,438,331 B2 * | 8/2002 | Sakaizawa et al. ............. 399/50 |
| 7,522,853 B2 * | 4/2009 | Uchitani .......................... 399/50 |
| 7,596,335 B2 | 9/2009 | Fukami et al. | |
| 7,630,658 B2 * | 12/2009 | Nishikawa ....................... 399/49 |
| 2001/0026694 A1 * | 10/2001 | Sakaizawa et al. ............. 399/50 |
| 2006/0115286 A1 * | 6/2006 | Uchitani et al. ................. 399/50 |
| 2007/0036578 A1 | 2/2007 | Fukami et al. | |
| 2007/0206970 A1 | 9/2007 | Izumi et al. | |
| 2008/0056743 A1 | 3/2008 | Fukami et al. | |
| 2008/0187352 A1 * | 8/2008 | Takeuchi ....................... 399/101 |
| 2008/0273891 A1 * | 11/2008 | Hamada et al. .................. 399/71 |
| 2008/0292354 A1 * | 11/2008 | Shinkawa et al. ............. 399/100 |

FOREIGN PATENT DOCUMENTS

| | | |
|---|---|---|
| JP | 8-220892 A | 8/1996 |
| JP | 2002-221862 | 8/2002 |
| JP | 2004-004283 | 1/2004 |
| JP | 2007-041348 A | 2/2007 |
| JP | 2007-241285 | 9/2007 |
| JP | 2008-058566 A | 3/2008 |

OTHER PUBLICATIONS

JP Office Action dtd Mar. 2, 2010, JP Appln. 2008-111548, partial English Translation.

* cited by examiner

*Primary Examiner* — Kimberly A Williams
(74) *Attorney, Agent, or Firm* — Banner & Witcoff, Ltd.

(57) ABSTRACT

An image forming apparatus is provided. A first cleaning unit is configured to collect a particle deposited on an object. An applying unit is configured to apply a voltage to the first cleaning unit. A first detector is configured to detect a first current flowing between the first cleaning unit and the object. A controller is configured to control the applying unit. When the detected first current becomes equal to or greater than a first predetermined value, the controller controls the applying unit to reduce the voltage applied to the first cleaning unit so as to make the first current smaller than the first predetermined value.

13 Claims, 12 Drawing Sheets

IMAGE FORMING APPARATUS

CROSS-REFERENCE TO RELATED APPLICATION

This application claims priority from Japanese Patent Application No. 2008-111548, filed on Apr. 22, 2008, the entire subject matter of which is incorporated herein by reference.

TECHNICAL FIELD

Aspects of the present invention relate to an image forming apparatus and in particular to an electrophotographic image forming apparatus.

BACKGROUND

For example, in a related-art electrophotographic image forming apparatus described in patent document 1, particles such as residual developer, deposited on an intermediate transfer belt are collected by an electrostatic attraction force (Coulomb force).

In patent document 1, when the residual developer is collected, a voltage is applied to a collection roller to such an extent that no electrical discharge occurs, thereby suppressing degradation of the intermediate transfer belt.

Patent document 1: Japanese Patent Publication No. 2002-221862A

In patent document 1, however, the voltage applied to the collection roller is determined based on the result of the test conducted at the developmental stage of the image forming apparatus to prevent the electrical discharge from occurring. Therefore, the degradation of an object such as the intermediate transfer belt cannot sufficiently be suppressed.

That is, the occurrence state of the electrical discharge, the degradation degree of the object, etc., largely vary due to the environment in which the image forming apparatus is installed, the use frequency of the image forming apparatus, etc., and therefore it is difficult to sufficiently suppress the degradation of the object with such a predetermined voltage.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

It is an aspect of the present invention to provide an image forming apparatus capable of collecting a particle deposited on an object while sufficiently suppressing degradation of the object.

The above and other aspects of the present invention are accomplished by providing an image forming apparatus comprising: a first cleaning unit which is configured to collect a particle deposited on an object; an applying unit which is configured to apply a voltage to the fist cleaning unit; a first detector which is configured to detect a first current flowing between the first cleaning unit and the object; and a controller which is configured to control the applying unit, wherein when the detected first current becomes equal to or greater than a first predetermined value, the controller controls the applying unit to reduce the voltage applied to the first cleaning unit so as to make the first current smaller than the first predetermined value.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

An embodiment is provided by applying an image forming apparatus of the invention to a direct tandem color laser printer. The embodiment of the invention will be discussed below with reference to the accompanying drawings:

First Embodiment

Figure 1:
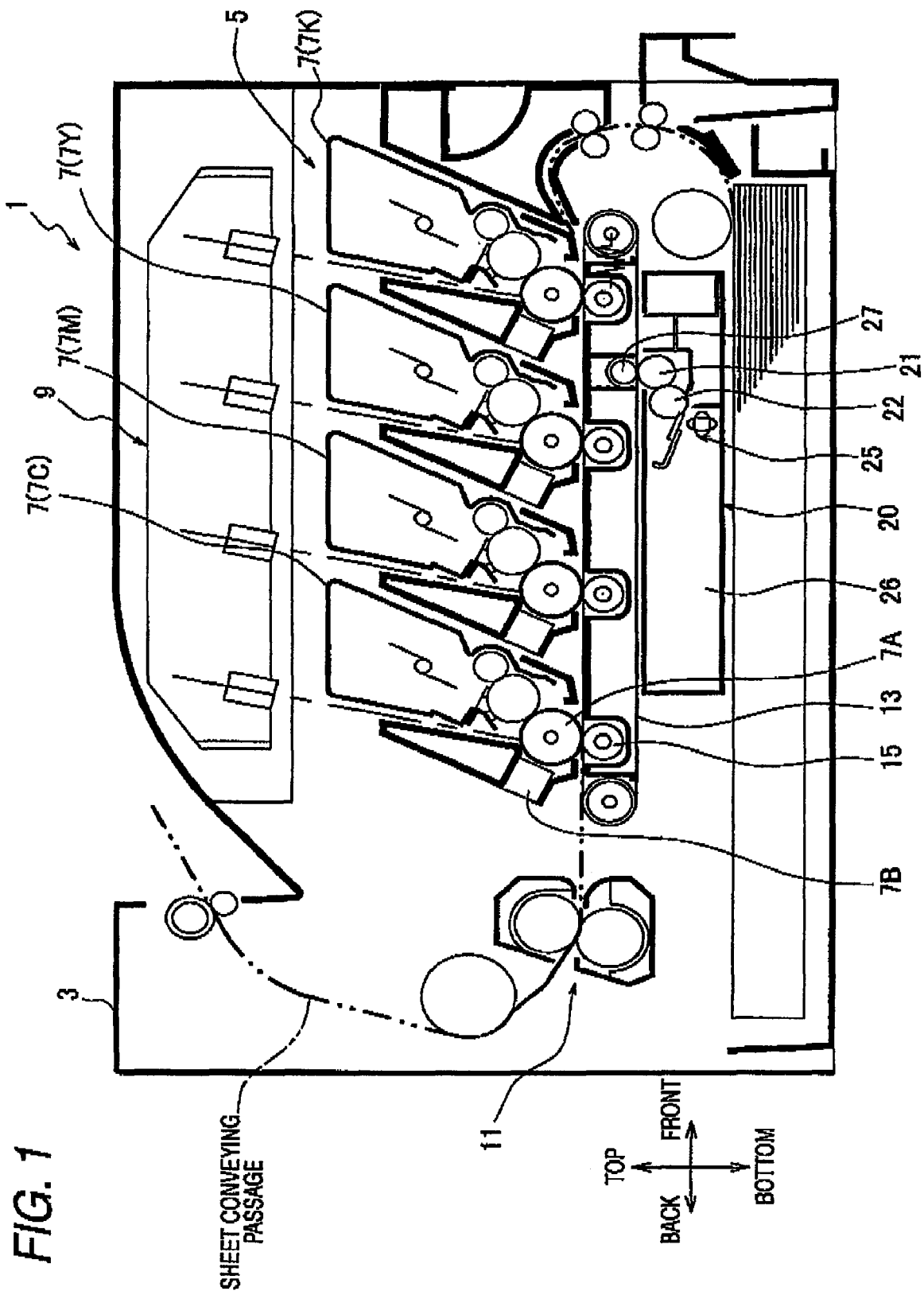
FIG. 1 is a sectional view illustrating a configuration of an image forming apparatus according to a first embodiment of the present invention.

Outline of Image Forming Apparatus
Schematic Structure of Image Forming Apparatus As shown in FIG. 1, electrophotographic image forming units 5 for transferring a developer image to a recording sheet of a recording sheet of paper, an OHP sheet, etc., (which will be hereinafter called sheet), thereby forming an image on the sheet are housed in a cabinet 3 of the image forming apparatus 1. Each of the image forming units 5 is made up of a process cartridge 7, an exposure device 9, a fixing unit 11, and the like.

The image forming apparatus 1 according to the embodiment is a direct tandem color laser printer and thus has a plurality of (in the embodiment, four) process cartridges 7 disposed in series along the conveying direction of a sheet.

Specifically, the four process cartridges 7 are a black process cartridge 7K, a yellow process cartridge 7Y, a magenta process cartridge 7M, and a cyan process cartridge 7C placed in order from the upstream side in the sheet conveying direction.

The process cartridges 7K, 7Y, 7M, and 7C differ only in stored developer color and are identical in structure, etc. Specifically, each of the process cartridges 7K, 7Y, 7M, and 7C is made up of a photoconductive drum 7A on which a developer image is supported, a charger 7B for charging the photoconductive drum 7A, etc. In FIG. 1, for convenience of space, the reference numerals of the photoconductive drum 7A and the charger 7B are given only to the cyan process cartridge 7C.

In the configuration described above, the charged photoconductive drum 7A is exposed by the exposure device 9 to form an electrostatic latent image on the outer peripheral surface of the photoconductive drum 7A and then a developer with a charge is applied to the photoconductive drum 7A, whereby a developer image is supported (formed) on the outer peripheral surface of the photoconductive drum 7A.

In this connection, in the embodiment, the developer is provided with a positive charge and on the other hand, the exposed portion of the photoconductive drum 7A by the exposure device 9, namely, the electrostatic latent image portion becomes a lower potential and other portions of the photoconductive drum 7A become a potential as charged by the charger 7B (higher potential than the electrostatic latent image portion). The developer has an intermediate potential between the potential of the electrostatic latent image portion (low potential) and the potential of other portions (high potential), the developer with a charge is attracted to the electrostatic latent image portion, and the developer image is supported on the outer peripheral surface of the photoconductive drum 7A.

A transfer roller 15 for transferring the developer image supported on the photoconductive drum 7A to a sheet is provided at a position opposed to the photoconductive drum 7A with a conveying belt 13 for conveying a sheet between. A negative potential is applied to the transfer roller 15.

Thus, the developer image supported on the photoconductive drum 7A is transferred to the sheet conveyed by the conveying belt 13. The sheet to which the developer image is transferred is conveyed to the fixing unit 11, which then heats the sheet for fusing (fixing) the developer image transferred to the sheet onto the sheet.

1.2 Detailed Structure of Belt Cleaner

The belt cleaner 20 is a device disposed at the opposite side to the process cartridge 7 with respect to the conveying belt 13 for removing particles of the developer, paper dust, etc., deposited on the surface of the conveying belt 13 of an object.

Figure 2:
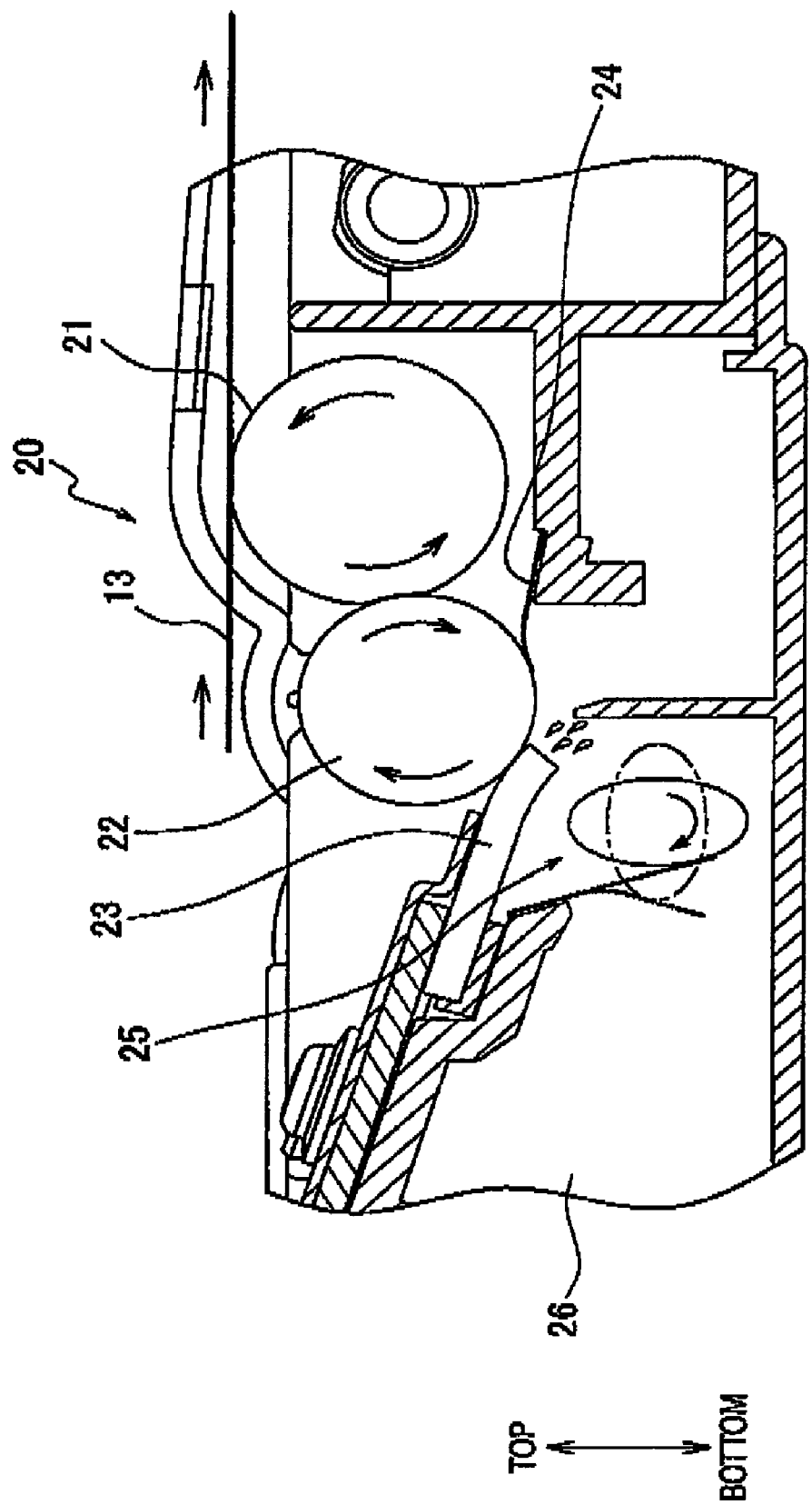
FIG. 2 is a schematic diagram illustrating a configuration of a belt cleaner according to the first embodiment.

As shown in FIG. 2, the belt cleaner 20 is made up of a cleaning roller 21, a cleaning shaft 22, a peeling blade 23, a scattering prevention blade 24, a pressure pump 25, an applied voltage control circuit 30 (see FIG. 3) for applying a voltage to the cleaning roller 21 and the cleaning shaft 22, and the like.

The cleaning roller 21 is disposed to face the conveying belt 13 for collecting the particles (mainly, developer) deposited on the surface of the conveying belt 13 therefrom. The cleaning shaft 22 collects the particles (the developer) deposited on the surface of the cleaning roller 21 and conveying the collected developer to a developer storage section 26.

A backup roller 27 (see FIG. 1) for pressing the conveying belt 13 against the cleaning roller 21 is provided at the opposite side to the cleaning roller 21 with respect to the conveying belt 13.

A potential having an opposite polarity to the charge of the developer (in the embodiment, negative potential) is applied to the cleaning roller 21 and the cleaning shaft 22. That is, the developer (the particles) deposited on the surface of the conveying belt 13 by the electrostatic attraction force occurring between the cleaning roller 21 and the developer is electrostatically attracted onto the cleaning roller 21 and the conveying belt 13 is cleaned.

At this time, control is performed so that the absolute value of the potential applied to the cleaning shaft 22 becomes larger than the cleaning roller 21 and thus the developer electrostatically attracted onto the cleaning roller 21 is collected from the cleaning roller 21 so that the developer is transferred to the cleaning shaft 22 by the electrostatic attraction force.

The developer collected on the surface of the cleaning shaft 22 is scraped off by the peeling blade 23 shaped like a thin plate. The scraped-off developer is prevented from scattering to the cleaning roller 21 by the scattering prevention blade 24 and is conveyed to the developer storage section 26 by the pressure pump 25.

The surface of the cleaning roller 21 is formed of a porous elastic body of urethane rubber, etc.; while, the surface of the cleaning shaft 22 is formed of a hard material (in the embodiment, metal).

Accordingly, the developer collected from the conveying belt 13 to the cleaning roller 21 by the electrostatic attraction force is conveyed to the cleaning shaft 22 in a state in which the developer is held in minute holes made in the surface of the cleaning roller 21. Then, the developer is collected to the cleaning shaft 22.

On the other hand, the developer electrostatically attracted onto the surface of the cleaning shaft 22 is mechanically scraped off by the peeling blade 23. Since the surface of the cleaning shaft 22 is made of metal, early abrasion of the cleaning shaft 22 scarcely occurs.

1.3 Controller of Belt Cleaner

Figure 3:
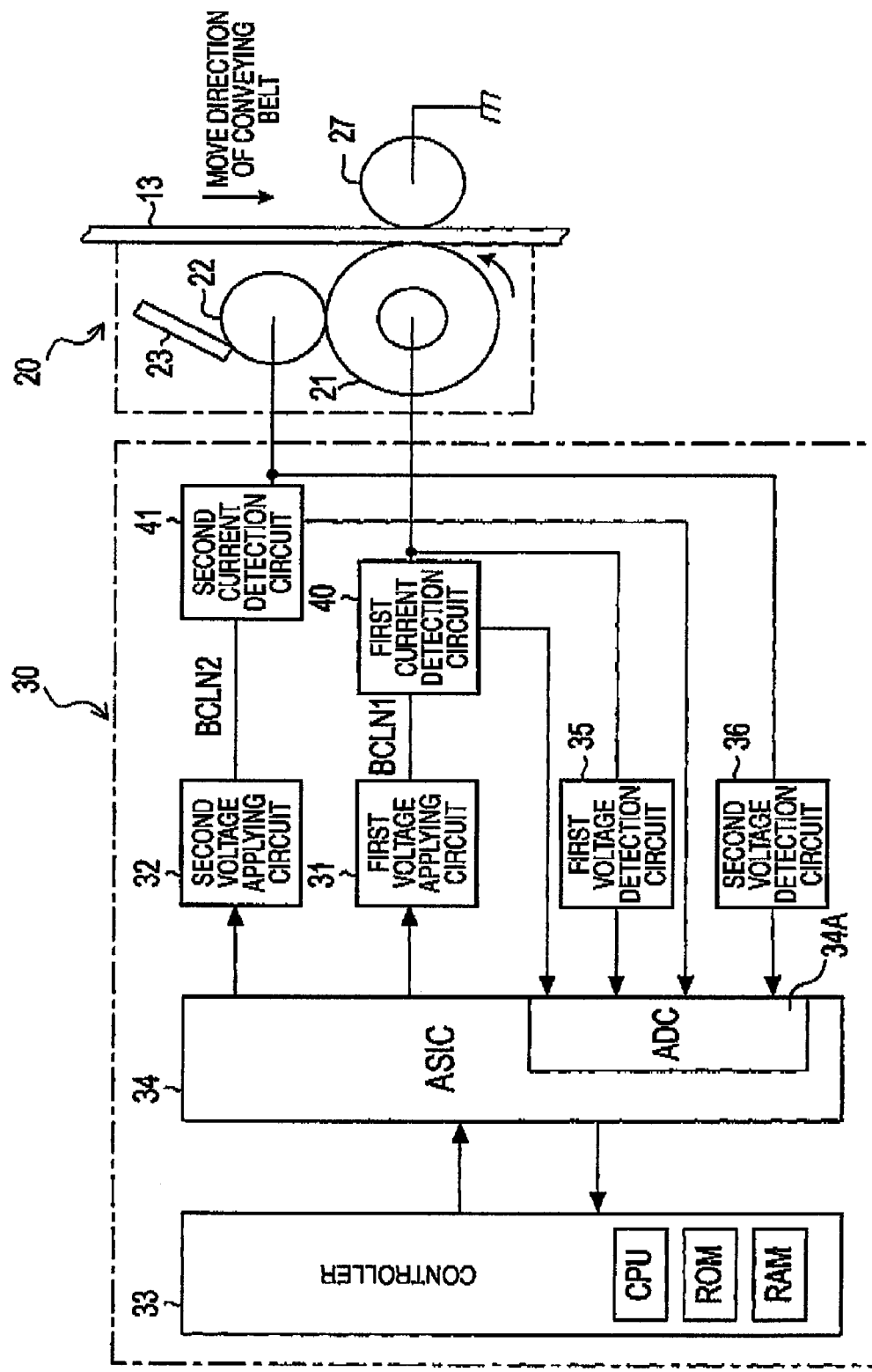
FIG. 3 is a schematic diagram illustrating an outline of an applied voltage control circuit according to the first embodiment.

The applied voltage control circuit 30 for applying a voltage to the belt cleaner 20 (cleaning roller 21 and cleaning shaft 22) is made up of a first voltage applying circuit 31, a second voltage applying circuit 32, a controller 33, and the like, as shown in FIG. 3.

The first voltage applying circuit 31 applies a voltage to the cleaning roller 21, thereby generating a predetermined potential on the cleaning roller 21. The second voltage applying circuit 32 applies a voltage to the cleaning shaft 22, thereby generating a predetermined potential on the cleaning shaft 22.

The controller 33 is a controller for controlling the first voltage applying circuit 31, the second voltage applying circuit 32, and the like. It is implemented as a microcomputer made up of a CPU, ROM, RAM, etc. A control program, etc., shown in a flowchart described later is stored in the ROM and the controller 33 (CPU) controls the first voltage applying circuit 31, etc., in accordance with the program stored in the ROM.

In this connection, in the embodiment, the controller 33 performs pulse width modulation (PWM) control of the first voltage applying circuit 31 and the second voltage applying circuit 32 through a drive control integrated circuit such as an ASIC (Application-Specific Integrated Circuit) 34.

A first voltage detection circuit 35 is a first voltage detector for detecting the voltage (potential) applied to the cleaning roller 21. A second voltage detection circuit 36 is a second voltage detector for detecting the voltage potential) applied to the cleaning shaft 22.

A first current detection circuit 40 detects a current flowing between the conveying belt 13 and the cleaning roller 21. A second current detection circuit 41 detects a current flowing between the cleaning roller 21 and the cleaning shaft 22.

The voltages detected by the first voltage detection circuit 35 and the second voltage detection circuit 36 are input to the controller 33 through an A/D converter 34A built in the ASIC 34. The controller 33 detects the current flowing between the conveying belt 13 and the cleaning roller 21 by the first current detection circuit 40 and detects the current flowing between the cleaning roller 21 and the cleaning shaft 22 by the second current detection circuit 41.

2. Operation of Belt Cleaner

2.1 Outline of Operation of Belt Cleaner

Since the belt cleaner 20 collects the developer (the particles) deposited on the conveying belt 13 using the electrostatic attraction force, if the impedance of the conveying belt 13 becomes small due to secular change, degradation, etc., of the conveying belt 13, large electrical discharge becomes more likely to occur between the cleaning roller 21 and the conveying belt 13. If large electrical discharge frequently occurs between the cleaning roller 21 and the conveying belt 13, degradation of the conveying belt 13 and the cleaning roller 21 is remarkably advanced.

Then, in the embodiment, the current flowing between the cleaning roller 21 and the conveying belt 13 is detected by according to the detection current of the first current detection circuit 40 and when the absolute value of the detected current value (which will be hereinafter referred to as first detection current value) becomes equal to or greater than a first predetermined value, the first voltage applying circuit 31 is controlled to reduce the voltage applied to the cleaning roller 21 so as to make the absolute value of the detection current value smaller than the first predetermined value.

Figure 4:
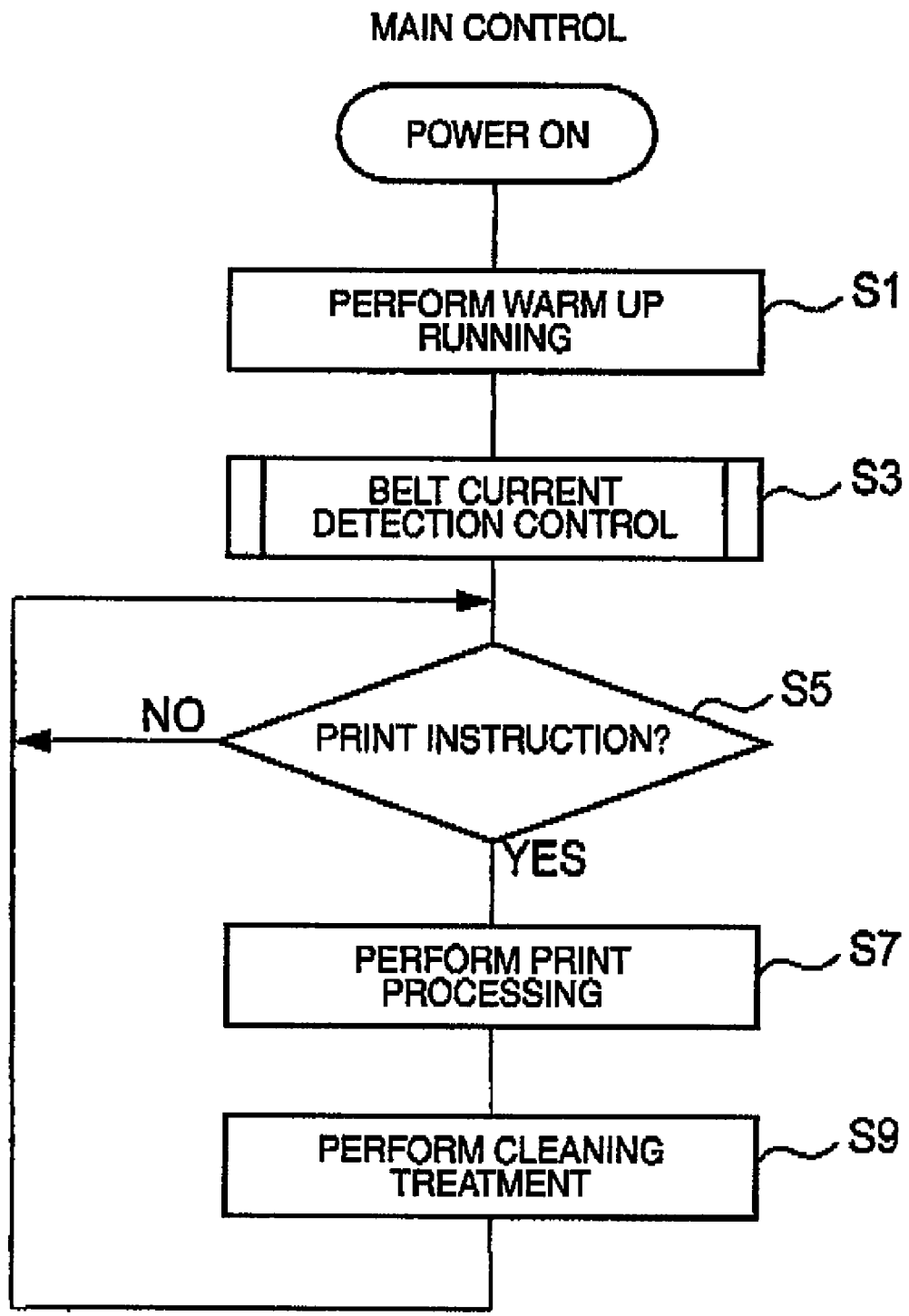
FIG. 4 is a flowchart illustrating a main control according to the first embodiment.

The first predetermined value is a current value with a high possibility that large electrical discharge may occur between the cleaning roller 21 and the conveying belt 13, and usually is a value determined by a test, etc. The topic will be discussed below in detail with flowcharts:

2.2 Main Control (see FIG. 4)

Main control shown in FIG. 4 is started when a power switch (not shown) of the image forming apparatus 1 is turned on (when the image forming apparatus is activated), and is terminated when the power switch is turned off (when the image forming apparatus is deactivated).

When the power switch is turned on and the main control is started, first, warm up running of raising the temperature of the fixing unit 11 to a predetermined temperature, etc., is executed (S1). Upon completion of the warm up running, belt current detection control is executed (S3). The belt current detection control is described later in detail.

Upon completion of the belt current detection control (S3), whether or not a print instruction is given to the image forming apparatus 1 is determined (S5). If it is determined that a print instruction is not given (NO at S5), a wait state is entered. On the other hand, if it is determined that a print instruction is given (YES at S5), print processing is executed in accordance with the print instruction (S7).

Next, cleaning treatment for collecting the developer (the particles) deposited on the conveying belt 13 is executed (S9) and then S5 is again executed. In the cleaning treatment (S9), a print time target voltage determined under the belt current detection control (see S39 in FIG. 6) is applied to the cleaning roller 21 and the cleaning shaft 22, whereby the developer (the particles) deposited on the conveying belt 13 is collected.

Figure 5:
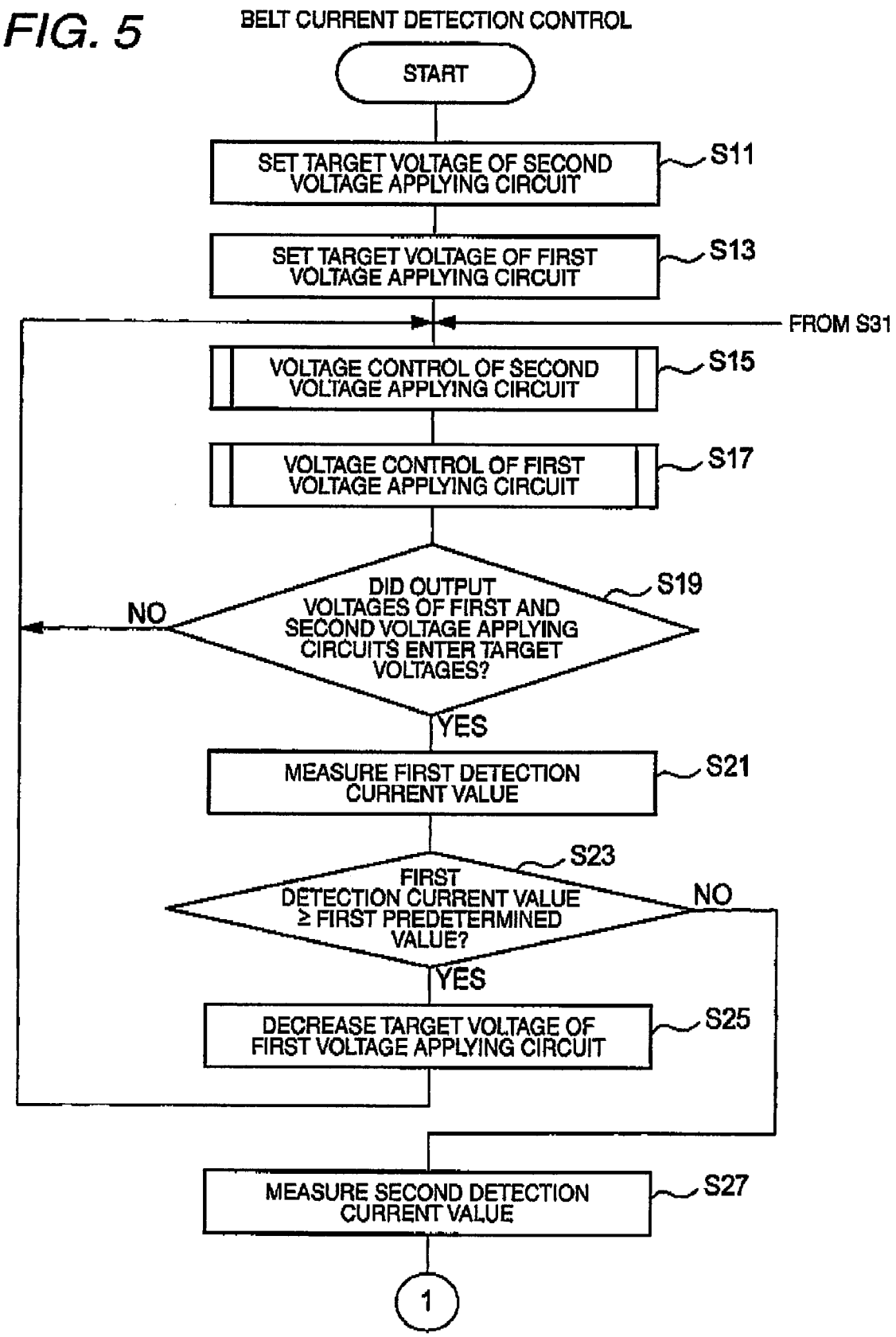
FIG. 5 is a flowchart illustrating a belt current detection control according to the first embodiment.
Figure 6:
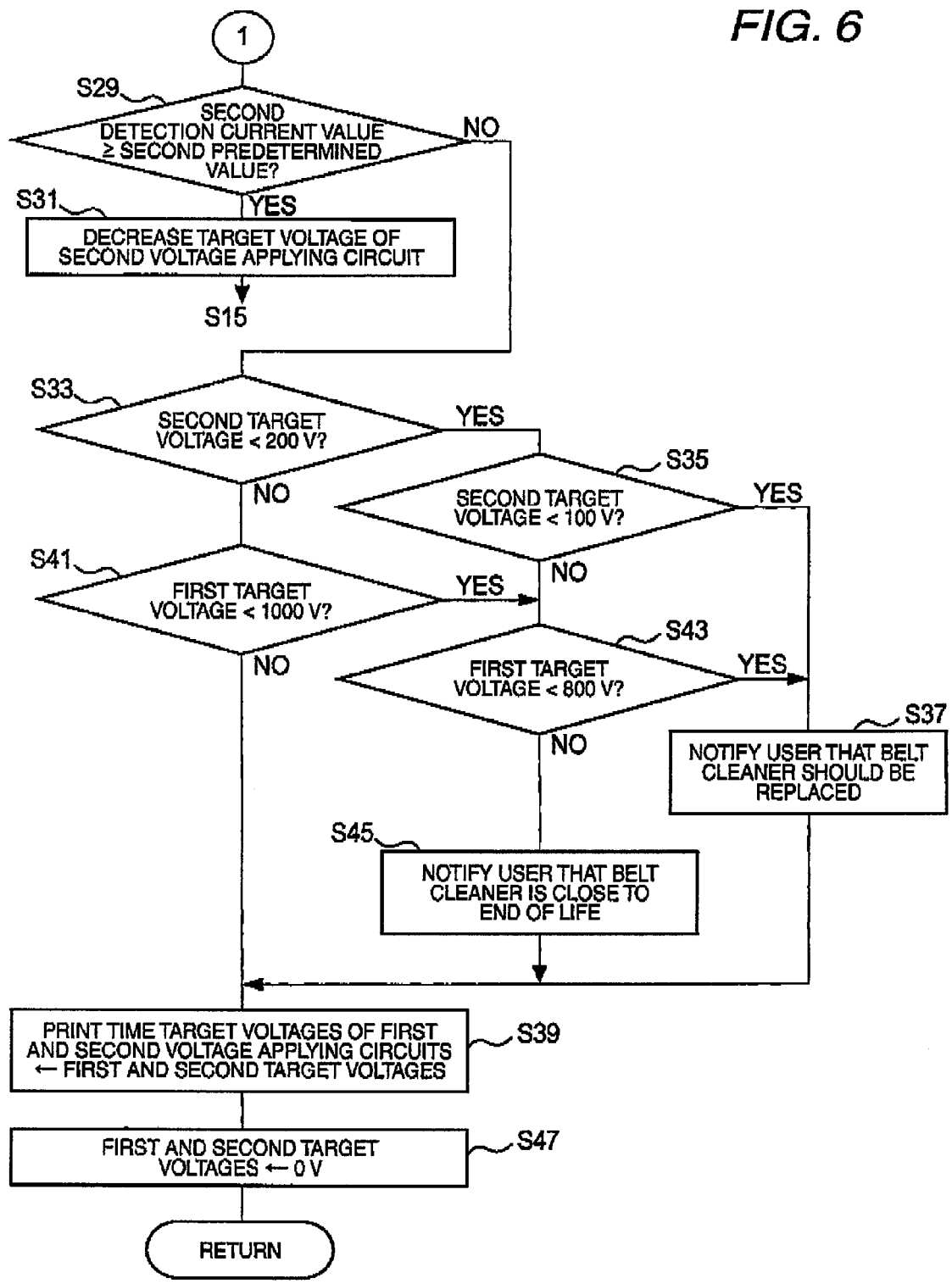
FIG. 6 is a flowchart illustrating the belt current detection control according to the first embodiment.

2.3 Belt Current Detection Control (see FIGS. 5 and 6)

When the belt current detection control is started, first a target voltage for controlling the second voltage applying circuit 32 (cleaning shaft 22) and a target voltage for controlling the first voltage applying circuit 31 (cleaning roller 21) are set (S11 and S13), as shown in FIG. 5.

The target voltage of the first voltage applying circuit 31 (which will be hereinafter referred to as first target voltage) is the absolute value of the potential difference between the backup roller 27 and the cleaning roller 21. The target voltage of the second voltage applying circuit 32 (which will be hereinafter referred to as second target voltage) is the absolute value of the potential difference between the cleaning roller 21 and the cleaning shaft 22. For example, the first target voltage is set to 1200 V and the second target voltage is set to 400 V.

In this connection, in the embodiment, since the developer is provided with a positive charge, a voltage is applied so that the cleaning roller 21 and the cleaning shaft 22 become each a negative potential. Thus, in the embodiment, the potential of the cleaning shaft 22 is lower than that of the cleaning roller 21. This means that the first target voltage becomes a smaller value than the second target voltage.

When the first target voltage and the second target voltage are set (S11 and S13), the first voltage applying circuit 31 and the second voltage applying circuit 32 are controlled so that the setup target voltages are provided (S15 and S17). Whether or not the applied voltages generated in the first voltage applying circuit 31 and the second voltage applying circuit 32 are the target voltages are determined based on the detection values of the first voltage detection circuit 35 and the second voltage detection circuit 36 (S19). The voltage control executed at S15 and S17 is described later in detail.

At this time, if it is not determined that the applied voltages generated in the first voltage applying circuit 31 and the second voltage applying circuit 32 are the target voltages (NO at S19), again S15 and S17 are executed.

On the other hand, if it is determined that the applied voltages generated in the first voltage applying circuit 31 and the second voltage applying circuit 32 are the target voltages (YES at S19), the absolute value of the current flowing between the cleaning roller 21 and the conveying belt 13 (which will be hereinafter referred to as first detection current value) is measured based on the detection value of the first current detection circuit 40 (S21).

Next, whether or not the first detection current value is equal to or greater than a first predetermined value is determined (S23). If it is determined that the first detection current value is equal to or greater than the first predetermined value (YES at S23), the first target voltage is again set to a voltage smaller by a predetermined voltage (S25) and then S15 is again executed.

The first predetermined value is a current value with a high possibility that the electrical discharge may occur between the cleaning roller 21 and the conveying belt 13, and usually is a value determined by a test, etc. The predetermined voltage at S25 about 100 V to 200 V.

If it is not determined that the first detection current value is equal to or greater than the first predetermined value (NO at S23), the absolute value of the current flowing between the cleaning shaft 22 and the cleaning roller 21 (second detection current value) is measured (S27).

Next, as shown in FIG. 6, whether or not the second detection current value is equal to or greater than a second predetermined value is determined (S29). If it is determined that the second detection current value is equal to or greater than the second predetermined value (YES at S29), the second target voltage is again set to a voltage smaller by a predetermined voltage (S31) and then S15 is again executed. The predetermined voltage at S31 is about 50 V to 100 V. At S31, the second target voltage is reduced so as to make the absolute value of the second detection current value smaller than the second predetermined value.

On the other hand, if it is not determined that the second detection current value is equal to or greater than the second predetermined value (NO at S29), whether or not the present second target voltage is less than a first threshold value (for example, 200 V) is determined (S33). If it is determined that the present second target voltage is less than the first threshold value (YES at S33), whether or not the present second target voltage is less than a second threshold value smaller than the first threshold value (for example, 100 V) is determined (S35).

If it is determined that the present second target voltage is less than the second threshold value (YES at S35), a warning that the belt cleaner 20 (particularly, the cleaning roller 21 and the cleaning shaft 22) should be replaced is issued as an image (text) message through a display panel (not shown) of the image forming apparatus 1 or as a voice message through a loudspeaker (not shown) (S37).

If it is not determined that the present second target voltage is less than the first threshold value (NO at S33), whether or not the present first target voltage is less than a third threshold value (for example, 1000 V) is determined (S41).

If it is determined that the present first target voltage is less than the third threshold value (YES at S41) or if it is not determined that the present second target voltage is less than the second threshold value (NO at S35), whether or not the present first target voltage is less than a fourth threshold value smaller than the third threshold value (for example, 800 V) is determined (S43).

Next, if it is determined that the present first target voltage is less than the fourth threshold value (YES at S43), S37 is executed. On the other hand, if it is not determined that that the present first target voltage is less than the fourth threshold value (NO at S43), a warning that the belt cleaner 20 (particularly, the cleaning roller 21 and the cleaning shaft 22) is close to the end of their life (replacing timing) is issued as an image message through the display panel or as a voice message through the loudspeaker (S45).

If it is not determined that the present fist target voltage is less than the third threshold value (NO at S41) or if S37 or S45 is executed, the present first target voltage is set as the print time target voltage of the first voltage applying circuit 31 and the present second target voltage is set as the print time target voltage of the second voltage applying circuit 32 (S39).

The first target voltage and the second target voltage are again set to the initial value (0) (S47) and then the belt current detection control is completed.

Figure 7:
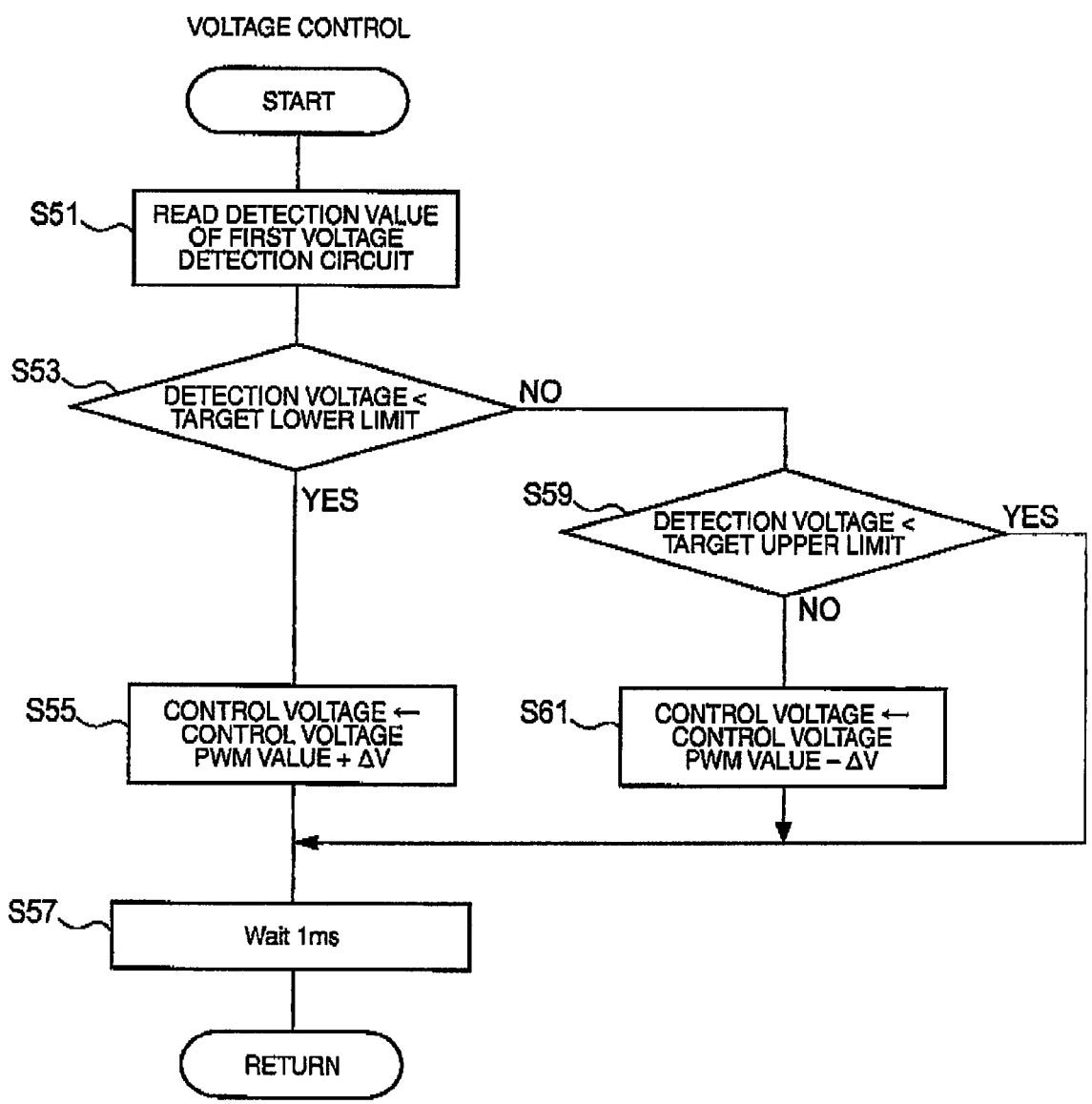
FIG. 7 is a flowchart illustrating a voltage control according to the first embodiment.

Voltage Control (see FIG. 7)

The voltage control executed at S15 and that executed at S17 of the belt current detection control (FIG. 5) differ only in target voltage and are identical in control operation and therefore the voltage control will be discussed by taking the voltage control (S17) executed for the first voltage applying circuit 31 as an example.

When the voltage control is started, first the voltage value detected by the first voltage detection circuit 35 (which will be hereinafter referred to as detection voltage value) is read through the A/D converter 34A (S51). Whether or not the read detection voltage value is smaller than a lower limit value based on the first target voltage is determined (S53).

If it is determined that the detection voltage value is smaller than the lower limit value (YES at S53), control voltage PWM value to control the first voltage applying circuit 31 is incremented by a predetermined value (S55) and after a lapse of a predetermined time (for example, 1 millisecond) (S57), the voltage control is completed.

On the other hand, if it is determined that the detection voltage value is equal to or larger than the lower limit value (NO at S53), whether or not the detection voltage value is smaller than an upper limit value based on the first target voltage is determined (S59). If it is determined that the detection voltage value is larger than the upper limit value (NO at S59), the control voltage PWM value is decremented by a predetermined value (S61) and after a lapse of the predetermined time (S57), the voltage control is completed.

If it is determined that the detection voltage value is less than the upper limit value, namely, if it is determined that the detection voltage value is between the upper limit value and the lower limit value (YES at S59), after a lapse of the predetermined time (S57), the voltage control is completed.

3. Features of Image Forming Apparatus According to the Embodiment

In the embodiment, when the first detection current value flowing between the conveying belt 13 and the cleaning roller 21 becomes equal to or greater than the first predetermined value, the print time target voltage which is used at the cleaning treatment time is reduced. Thus, even when the occurrence state of the electrical discharge and the degradation degree of the conveying belt 13 significantly vary due to the environment in which the image forming apparatus 1 is installed and the use frequency of the image forming apparatus 1, the particles such as developer, deposited on the conveying belt 13 can be collected while sufficiently retarding the progression of the degradation of the conveying belt 13.

By the way, apparent impedance of the cleaning roller 21 changes due to the effect of the particles (for example, paper dust) collected from the conveying belt 13. Accordingly, the current flowing between the cleaning roller 21 and the cleaning shaft 22 may increase.

When the current flowing between the cleaning roller 21 and the cleaning shaft 22 increases, the electrical discharge becomes more likely to occur. When the electrical discharge occurs, the cleaning roller 21 actually degrades and the actual impedance of the cleaning roller 21 decreases. Thus, the current flowing between the cleaning roller 21 and the conveying belt 13 further increases and the degradation of the conveying belt 13 may be remarkably advanced.

In contrast, in the embodiment, if the second detection current value is equal to or greater than the second predetermined value, the voltage between the cleaning roller 21 and the cleaning shaft 22 is reduced for suppressing degradation of the cleaning roller 21, so that the increment of the current flowing between the cleaning roller 21 and the conveying belt 13 (frequent occurrence of the electrical discharge) can be suppressed and degradation of the conveying belt 13 can be suppressed.

In the embodiment, if the first, second target voltage, namely, the print time target voltage becomes smaller than the second or fourth threshold value, a warning message is issued to the user, so that degradation of the conveying belt 13, the belt cleaner 20, etc., can be prevented from being advanced while the user is not aware of the degradation.

In the embodiment, the belt current detection control to determine the print time target voltage is executed at least each time when the power of the image forming apparatus 1 is turned on (the image forming apparatus 1 is activated), so that early advance of degradation of the conveying belt 13 or the belt cleaner 20 can be suppressed.

Second Embodiment

Figure 8:
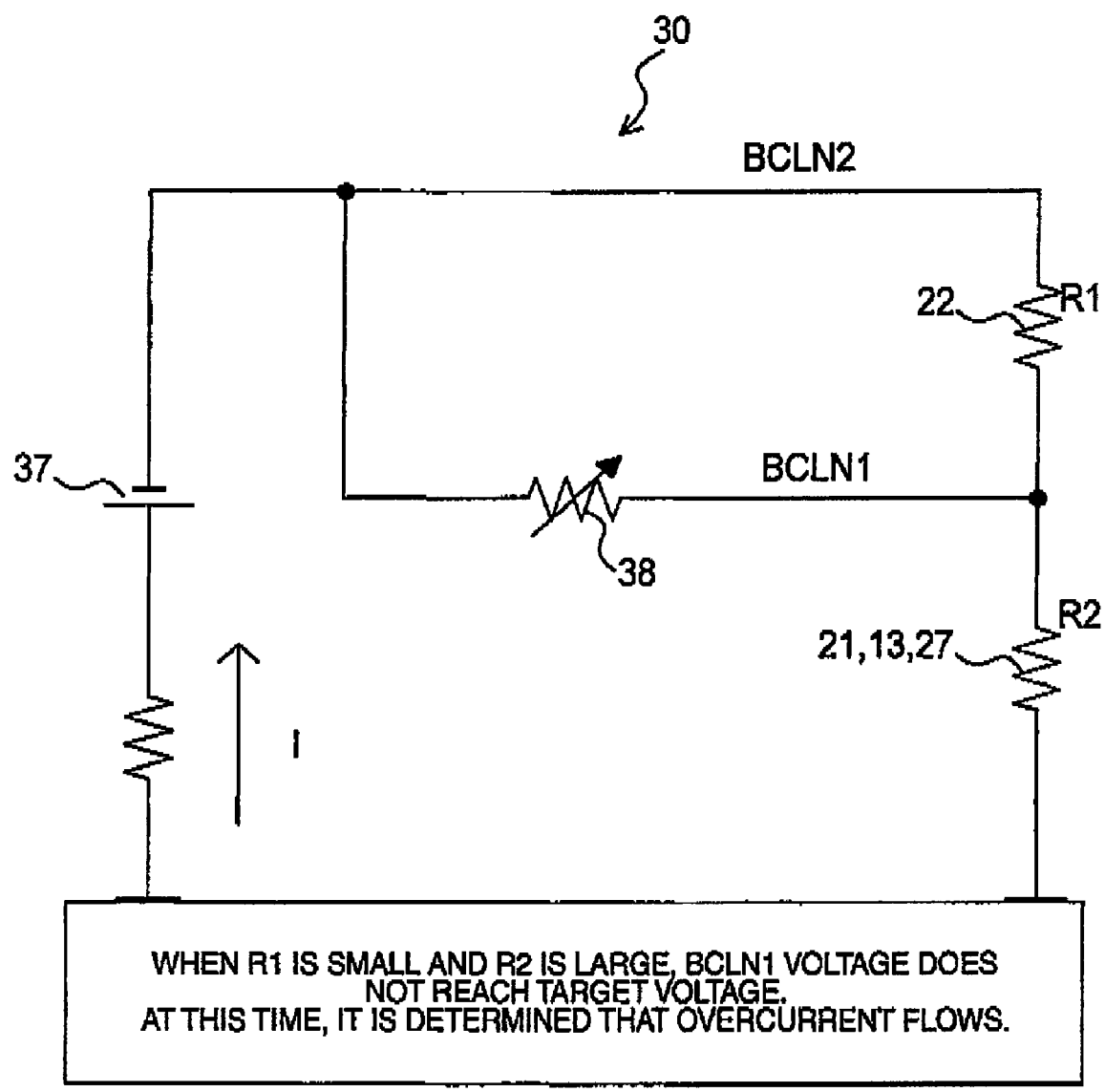
FIG. 8 is a schematic diagram illustrating an outline of an applied voltage control circuit according to a second embodiment of the present invention.

In the first embodiment, the two voltage applying circuits 31 and 32 make up the applying unit. In an applied voltage control circuit 30 according to a second embodiment of the invention, one voltage applying circuit 37 applies a predetermined voltage between a cleaning shaft 22 and a backup roller 27, and the potential between the cleaning shaft 22 and a cleaning roller 21 is adjusted using a variable resistor 38, as shown in FIG. 8. In this connection, the variable resistor 38 according to the embodiment is a shunt resistor (shunt element) implemented as a semiconductor.

That is, in the applied voltage control circuit 30 according to the embodiment, the voltage between the cleaning roller 21 and the backup roller 27, namely, the voltage between the cleaning roller 21 and a conveying belt 13 is controlled with the variable resistor 38.

In FIG. 8, R1 represents impedance occurring in the cleaning shaft 22 and R2 represents impedance occurring between the cleaning roller 21 and the backup roller 27.

In FIG. 8, a first voltage detection circuit 35 and a second voltage detection circuit 36 are not shown. In the embodiment, the first voltage detection circuit 35 detects voltage (BCLN1 voltage) between the cleaning roller 21 and the backup roller 27, and the second voltage detection circuit 36 detects voltage (BCLN2 voltage) between the cleaning shaft 22 and the backup roller 27.

The operation of a belt cleaner 20 according to the embodiment will be discussed based on FIGS. 9 and 10. Main control and voltage control are identical with those of the first embodiment and therefore will not be discussed again.

Figure 9:
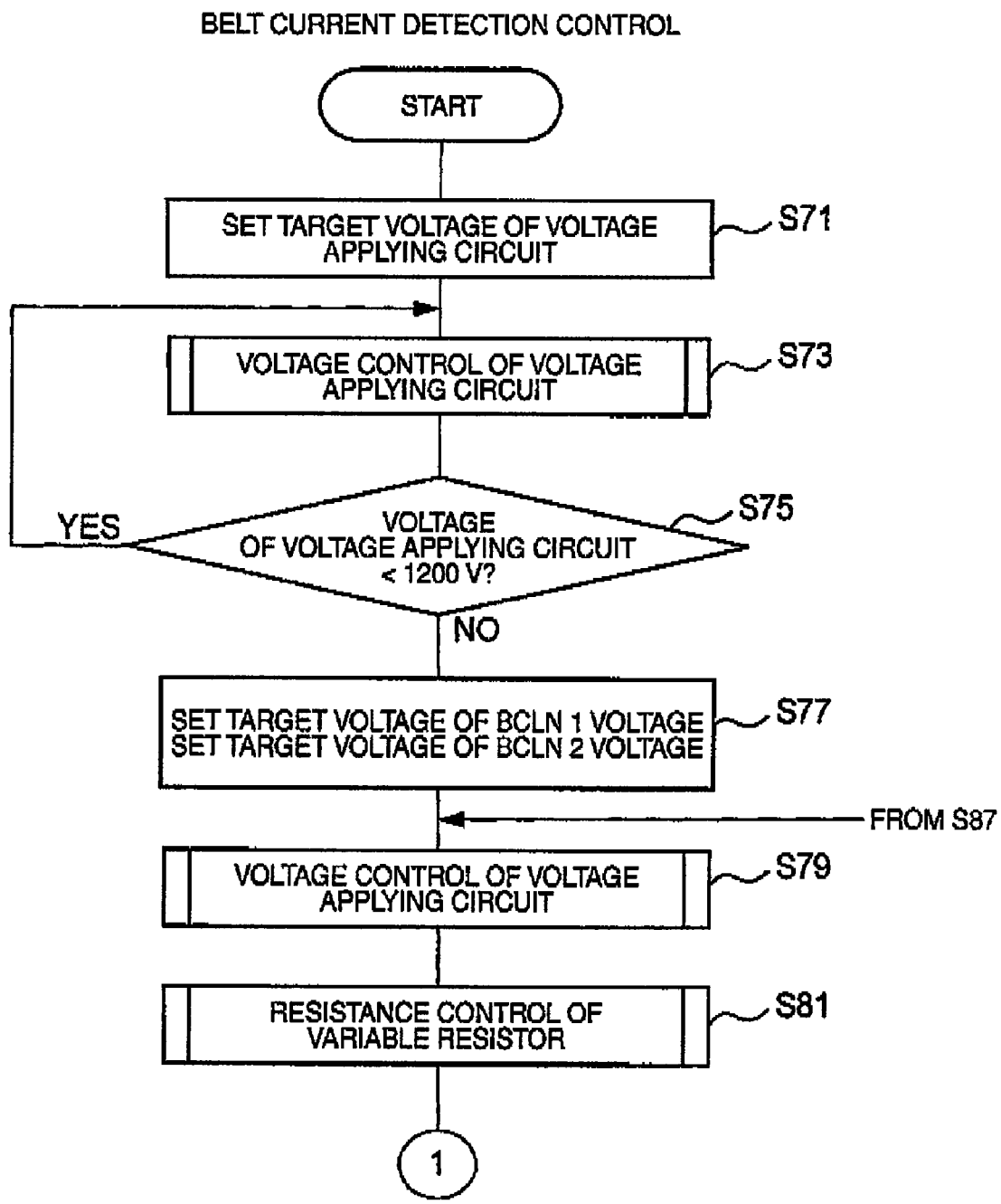
FIG. 9 is a flowchart illustrating a belt current detection control according to the second embodiment.

When belt current detection control is started, first, as shown in FIG. 9, a control target voltage (simply, target voltage) of the voltage applying circuit 37 is set (S71) and the voltage applying circuit 37 is controlled so that the voltage becomes the setup target voltage (S73). Then, whether or not an applied voltage generated in the voltage applying circuit 37 is smaller than the target voltage (for example, 1200 V) is determined based on the detection value of the second voltage detection circuit 36 (S75).

In the embodiment, the voltage applying circuit 37 applies voltage between the backup roller 27 and the cleaning shaft 22 and thus the target voltage at S71 indicates the absolute value of the potential difference between the backup roller 27 and the cleaning shaft 22 (which will be hereinafter referred to as BCLN2 voltage).

If it is determined that the BCLN2 voltage is smaller than the target voltage (YES at S75), S73 is again executed. On the other hand, if it is not determined that the BCLN2 voltage is smaller than the target voltage (NO at S75), the target voltage of the BCLN1 voltage is set and the target voltage of the BCLN2 voltage is again set (S77).

The reason why S71 to S75 are executed before S77 is executed is as follows:

In the embodiment, as described above, the BCLN1 voltage is controlled by adjusting the potential between the cleaning shaft 22 and the cleaning roller 21 in a state in which a predetermined voltage is applied between the cleaning shaft 22 and the backup roller 27.

Thus, if control of the BCLN1 voltage is started in a state in which the BCLN2 voltage is 0 V, the BCLN1 voltage also becomes 0 V and therefore the control voltage for controlling the variable resistor 38 remains the maximum value and is firm and an uncontrollable state is entered.

Then, in the embodiment, after the BCLN2 voltage is set larger than the target voltage of the BCLN1 voltage (for example, 1200 V), the target voltage of the BCLN2 voltage is again set and control of the BCLN1 voltage and the BCLN2 voltage is started.

In this connection, in the embodiment, the control voltage can be variably controlled in the range of 0 V to 5 V; in the embodiment, the larger the control voltage, the larger the BCLN1 voltage.

When the target voltages of the BCLN1 voltage and the BCLN2 voltage are set (S77), the voltage applying circuit 37 and the variable resistor 38 are controlled so that the voltages become the setup target voltages (S79 and S81).

Figure 10:
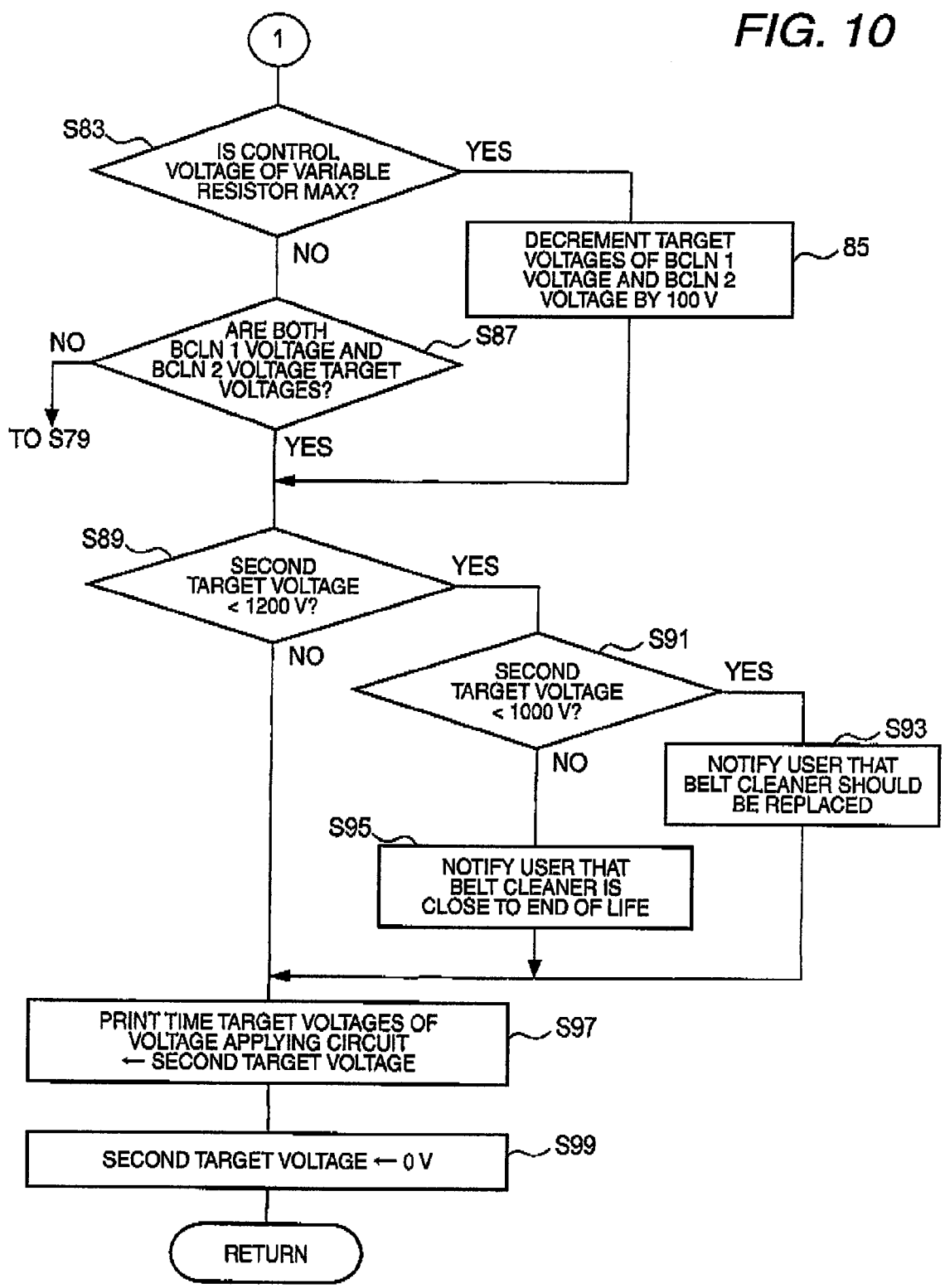
FIG. 10 is a flowchart illustrating the belt current detection control according to the second embodiment.

Next, as shown in FIG. 10, whether or not the control voltage for the BCLN1 voltage (variable resistor 38) is the maximum value, namely, whether or not the voltage between the cleaning roller 21 and the backup roller 27 becomes large and the value of the current flowing between the cleaning roller 21 and the conveying belt 13 (corresponding to the first detection current value in the first embodiment) becomes equal to or greater than a predetermined value is determined (S83).

The reason why the voltage between the cleaning roller 21 and the backup roller 27 becomes large when the control voltage is the maximum value is as follows: When the impedance between the cleaning roller 21 and the cleaning shaft 22 lowers, if the resistance of the variable resistor 38 is increased, it becomes impossible to make large the voltage between the cleaning roller 21 and the cleaning shaft 22.

At this time, if it is determined that the control voltage is the maximum value, namely, the current value corresponding to the first detection current value becomes equal to or greater than the predetermined value (YES at S83), the target voltages of the BCLN1 voltage and the BCLN2 voltage are again set each to a voltage lower than the present target voltage by a predetermined voltage (for example, 100 V) (S85).

On the other hand, if it is not determined that the control voltage is the maximum value, namely, if it is not determined that the current value corresponding to the first detection current value becomes equal to or greater than the predetermined value (NO at S83), whether or not the BCLN1 voltage detected by the first voltage detection circuit 35 and the BCLN2 voltage detected by the second voltage detection circuit 36 become the target voltages is determined (S87).

If it is determined that at least either of the BCLN1 voltage and the BCLN2 voltage does not become the target voltage (NO at S87), again S79 is executed.

On the other hand, if it is determined that both of the BCLN1 voltage and the BCLN2 voltage become the target voltages (YES at S87) or if S85 is executed, whether or not the present target voltage of the BCLN2 voltage (which will be hereinafter referred to as second target voltage) is less than a fifth threshold value (for example, 1200 V) is determined (S89).

If it is determined that the present second target voltage is less than the fifth threshold value (YES at S89), whether or not the present second target voltage is less than a sixth threshold value smaller than the fifth threshold value (for example, 1000 V) is determined (S91).

At this time, if it is determined that the present second target voltage is less than the sixth threshold value (YES at S91), a warning that the belt cleaner 20 should be replaced is issued as an image message through a display panel or as a voice message through a loudspeaker (S93).

If it is not determined that the present second target voltage is less than the sixth threshold value (NO at S91), a warning that the belt cleaner 20 is close to the end of its life is issued as an image message through the display panel or as a voice message through the loudspeaker (S95).

If it is not determined that the present second target voltage is less than the fifth threshold value (NO at S89) or if S93 or S95 is executed, the present second target voltage is set as the print time target voltage of the voltage applying circuit 37 (S97).

Then, the second target voltage is again set to the initial value (0) (S99) and then the belt current detection control is completed.

As described above, in the embodiment, whether or not the value of the current flowing between the cleaning roller 21 and the conveying belt 13, namely, the first detection current value becomes equal to or greater than the predetermined value can be easily determined based on the control voltage of the variable resistor 38.

Third Embodiment

Figure 11:
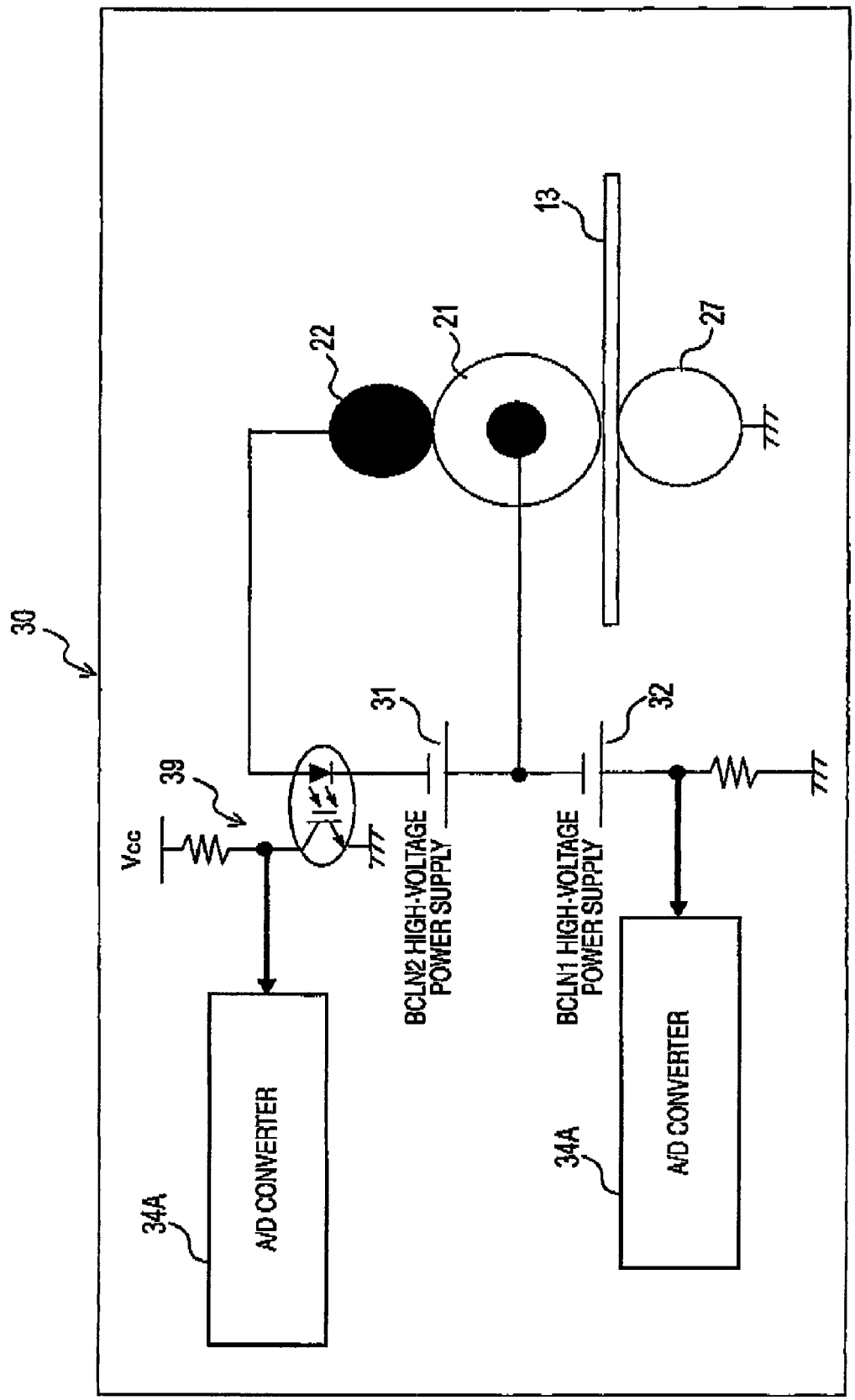
FIG. 11 is a schematic diagram illustrating an outline of an applied voltage control circuit according to a third embodiment of the present invention.

In the first embodiment, the second detection current value is detected based on the detection voltage of the second voltage detection circuit 36. In a third embodiment of the invention, in an applied voltage control circuit 30 similar to the applied voltage control circuit 30 according to the first embodiment, the value of a current flowing between a cleaning roller 21 and a cleaning shaft 22 (second detection current value) is detected using a photocoupler 39, as shown in FIG. 11.

That is, the voltage input to an A/D converter 34A from a photocoupler increases or decreased in response to an increase or a decrease in the second detection current value. Thus, in the embodiment, the second detection current value is detected based on the voltage input to the A/D converter 34A from the photocoupler.

Fourth Embodiment

In the embodiments described above, lie first predetermined value, etc., of the threshold value of the first detection current value flowing between the cleaning roller 21 and the conveying belt 13 is a value determined by test and examination at the developing stage. In a fourth embodiment of the invention, when an image forming apparatus 1 is manufactured, a first predetermined value, etc., is set for each manufactured image forming apparatus 1.

Figure 12:
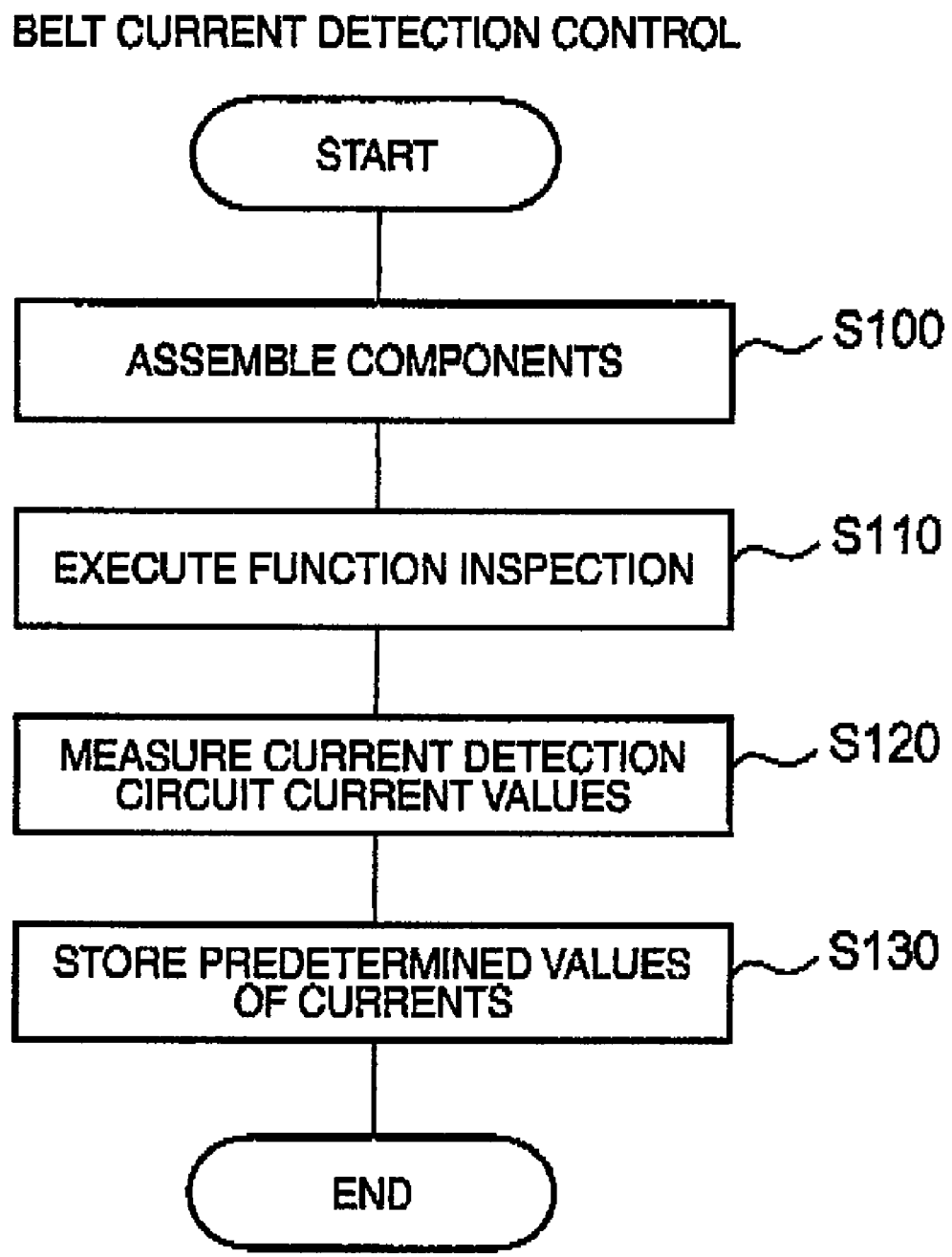
FIG. 12 is a flowchart illustrating a manufacturing process of an image forming apparatus according to a four embodiment of the present invention.

As shown in FIG. 12, when the image forming apparatus 1 is manufactured, first the components and the devices making up the image forming apparatus 1 are assembled (assembling step)(S100).

Next, inspection as to whether or not the assembled components and devices normally operate is conducted (S110). Then, the current flowing between a cleaning roller 21 and a conveying belt 13 and the current flowing between the cleaning roller 21 and a cleaning shaft 22 are measured in a state in which a voltage is applied to the cleaning roller 21, etc., (measuring step)(S120).

A first predetermined value and a second predetermined value determined with the current values measured at S120 as the reference are stored in ROM of a controller 33 (storing step) (S130) and manufacturing of the image forming apparatus 1 is completed.

As described above, in the embodiment, the value considering the individual difference from one image forming apparatus 1 to another is set as the first predetermined value. Thus, if a large variation occurs depending on the environment in which the image forming apparatus 1 is installed and the use frequency of the image forming apparatus 1, particles of the developer, deposited on the conveying belt 13 can be collected while reliably suppressing degradation of the conveying belt 13.

Other Embodiments

In the embodiments described above, the invention is applied to the belt cleaner 20 for collecting the developer (the particles), deposited on the conveying belt 13, but the invention is not limited to the application and can also be applied to a belt cleaner of an intermediate transfer belt to which a developer image is transferred.

In the embodiments described above, when the first detection current value becomes equal to or greater than the first predetermined value, the first voltage applying circuit 31 is controlled to reduce the voltage applied to the cleaning roller 21. The first voltage applying circuit 31 may be controlled to increase the voltage applied to the cleaning roller 21 when the first detection current value becomes smaller than a third predetermined value which is smaller than the first predetermined value.

With this operation, the voltage between the cleaning roller 21 and the conveying belt 13 can be prevented from becoming excessively small, so that the particles of the developer, can be reliably collected. The detection method of the fist detection current value and the second detection current value is not limited to the method shown in the embodiments described above.

In the embodiments described above, the belt current detection control to determine the print time target voltage is executed at least each time power of the image forming apparatus 1 is turned on, but the invention is not limited to the mode. The belt current detection control may be executed, for example, when a cover (not shown) is closed after the cover is opened to replace the process cartridge, etc.

The belt current detection control may be executed every given number of print sheets.

It is to be understood that the invention is not limited to the specific embodiments described above and various modifications may be made without departing from the spirit and scope of the invention as claimed.

The present invention can be implemented in illustrative non-limiting aspects as follows:

In a first aspect, there is provided an image forming apparatus comprising: a first cleaning unit which is configured to collect a particle deposited on an object; an applying unit which is configured to apply a voltage to the first cleaning unit; a first detector which is configured to detect a first current flowing between the first cleaning unit and the object; and a controller which is configured to control the applying unit, wherein when the detected first current becomes equal to or greater than a first predetermined value, the controller controls the applying unit to reduce the voltage applied to the first cleaning unit so as to make the first current smaller than the first predetermined value.

Accordingly, even when the occurrence state of the electrical discharge and the degradation degree of the object significantly vary due to the environment in which the image forming apparatus is installed and the use frequency of the image forming apparatus, the particle deposited on the object can be collected while sufficiently suppressing degradation of the object.

Here, the "current" flowing between the first cleaning unit and the object, etc. means the absolute value of the current and is not a value considering the current polarity positive or negative). Likewise, the "voltage" between the first cleaning unit and the object, etc., also means the absolute value of the voltage and is not a value considering the voltage polarity (positive or negative).

In a second aspect, there is provided the image forming apparatus according to the first aspect, further comprising: a second cleaning unit which is configured to collect the particle collected by and deposited on the first cleaning unit; and a second detector which is configured to detect a second current flowing between the first cleaning unit and the second cleaning unit, wherein the applying unit is configured to apply a voltage to the second cleaning unit, wherein when the detected second current becomes equal to or greater than a second predetermined value, the controller controls the applying unit to reduce the voltage applied to the second cleaning unit so as to make the second current smaller than the second predetermined value.

By the way, apparent impedance of the first cleaning unit changes due to the effect of the particle collected from the object (for example, paper dust). Accordingly, the second current flowing between the first cleaning unit and the second cleaning unit may increase.

When the second current flowing between the first cleaning unit and the second cleaning unit increases, the electrical discharge becomes more likely to occur. When the electrical discharge occurs, the first cleaning unit actually degrades and the actual impedance of the first cleaning unit decreases. Thus, the first current flowing between the first cleaning unit and the object further increases and the degradation of the object may be remarkably advanced.

In contrast, in the second aspect, if the detected second current is equal to or greater than the second predetermined value, the voltage between the first cleaning unit and the second cleaning unit is reduced for suppressing degradation of the first cleaning unit, so that the increment of the first current flowing between the first cleaning unit and the object (frequent occurrence of the electrical discharge) can be suppressed and degradation of the object can be suppressed.

In a third aspect, there is provided the image forming apparatus according to the first aspect or the second aspect, wherein at least one of the first detector and the second detector includes a photocoupler. Therefore, the detectors can be easily formed.

In a fourth aspect, there is provided the image forming apparatus according to the first aspect, wherein the first cleaning unit has: a cleaning roller which is disposed to face the object and is configured to collect the particle deposited on the object; a cleaning shaft which is configured to collect the particle collected by and deposited on the cleaning roller, and a backup roller which is disposed at an opposite side to the cleaning roller with respect to the object, wherein the applying unit applies a predetermined voltage between the cleaning shaft and the backup roller and adjusts a voltage between the cleaning roller and the backup roller by adjusting a voltage between the cleaning shaft and the cleaning roller, and wherein the first detector detects the first current based on the voltage between the cleaning shaft and the cleaning roller.

In a fifth aspect, there is provided the image forming apparatus according to any one of the first aspect to the fourth aspect, wherein the object includes a conveying belt which is configured to convey a recording sheet to which developer is transferred.

In a sixth aspect, there is provided the image forming apparatus according to any one of the first aspect to the fifth aspect, wherein the controller controls the applying unit at least when the image forming apparatus is activated.

In a seventh aspect, there is provided the image forming apparatus according to the first to sixth aspect, wherein the controller controls the applying unit to increase the voltage applied to the first cleaning unit when the detected first current becomes smaller than a second predetermined value which is smaller than the first predetermined value.

In a eighth aspect, there is provided the image forming apparatus according to the first aspect to the seventh aspect, further comprising: a warning unit which is configured to issue a warning, wherein the applying unit adjusts the voltage applied to the first cleaning unit based on a first target voltage, wherein the controller changes the first target voltage to control the applying unit based on the detected first current, and wherein the warning unit issues the warning when the first target voltage is smaller than a threshold value.

In an ninth aspect, there is provided the image forming apparatus according to the second aspect, further comprising a warning unit which is configured to issue a first warning and a second warning in different manners from each other, wherein the applying unit adjusts the voltage applied to the first cleaning unit based on a first target voltage and adjusts the voltage applied to the second cleaning unit based on a second target voltage, wherein the controller changes the first target voltage and the second target voltage to control the applying unit, and wherein the warning unit issues one of the first and second warnings based on at least one of the first target voltage and the second target voltage.

In an tenth aspect, there is provided a method for manufacturing the image forming apparatus according to any one of the first aspect to the ninth aspect, the method comprising: assembling a plurality of components constituting the image forming apparatus; measuring die first current flowing between the first cleaning unit and the object while applying the voltage to the first cleaning unit; determining the first predetermined value based on the detected first current; and storing the determined first predetermined value into a storage of the image forming apparatus.

Accordingly, the value considering the individual difference from one image forming apparatus to another is set as the first predetermined value. Thus, even when the occurrence state of the electrical discharge and the degradation degree of the object significantly vary due to the environment in which the image forming apparatus is installed and the use frequency of the image forming apparatus, the particle deposited on the object can be collected while sufficiently suppressing degradation of the object.

While the present invention has been shown and described with reference to certain exemplary embodiments thereof it will be understood by those skilled in the art that various changes in form and details may be made therein without departing from the spirit and scope of the invention as defined by the appended claims.

What is claimed is:
1. An image forming apparatus comprising:
a first cleaning unit which is configured to collect a particle deposited on an object;
an applying unit which is configured to apply a voltage to the first cleaning unit;
a first detector which is configured to detect a first current flowing between the first cleaning unit and the object;
a warning unit which is configured to issue a warning; and
a controller which is configured to control the applying unit,
wherein when the detected first current becomes equal to or greater than a first predetermined value, the controller controls the applying unit to reduce the voltage applied to the first cleaning unit so as to make the first current smaller than the first predetermined value,
wherein the applying unit adjusts the voltage applied to the first cleaning unit based on a first target voltage,
wherein the controller changes the first target voltage to control the applying unit based on the detected first current, and
wherein the warning unit issues the warning when the first target voltage is smaller than a threshold value.
2. The image forming apparatus according to claim 1, wherein the first cleaning unit has:
a cleaning roller which is disposed to face the object and is configured to collect the particle deposited on the object;

a cleaning shaft which is configured to collect the particle collected by and deposited on the cleaning roller; and a backup roller which is disposed at an opposite side to the cleaning roller with respect to the object, wherein the applying unit applies a predetermined voltage between the cleaning shaft and the backup roller and adjusts a voltage between the cleaning roller and the backup roller by adjusting a voltage between the cleaning shaft and the cleaning roller, and wherein the first detector detects the first current based on the voltage between the cleaning shaft and the cleaning roller.

3. The image forming apparatus according to claim 1, wherein the object includes a conveying belt which is configured to convey a recording sheet to which developer is transferred.

4. The image forming apparatus according to claim 1, wherein the controller controls the applying unit at least when the image forming apparatus is activated.

5. The image forming apparatus according to claim 1, wherein the controller controls the applying unit to increase the voltage applied to the first cleaning unit when the detected first current becomes smaller than a second predetermined value which is smaller than the first predetermined value.

6. A method for manufacturing the image forming apparatus according to claim 1, the method comprising:
assembling a plurality of components constituting the image forming apparatus;
measuring the first current flowing between the first cleaning unit and the object while applying the voltage to the first cleaning unit;
determining the first predetermined value based on the detected first current; and
storing the determined first predetermined value into a storage of the image forming apparatus.

7. An image forming apparatus comprising:
a first cleaning unit which is configured to collect a particle deposited on an object;
an applying unit which is configured to apply a voltage to the first cleaning unit;
a first detector which is configured to detect a first current flowing between the first cleaning unit and the object;
a controller which is configured to control the applying unit,
a second cleaning unit which is configured to collect the particle collected by and deposited on the first cleaning unit;
a second detector which is configured to detect a second current flowing between the first cleaning unit and the second cleaning unit; and
a warning unit which is configured to issue a first warning and a second warning in different manners from each other,
wherein when the detected first current becomes equal to or greater than a first predetermined value, the controller controls the applying unit to reduce the voltage applied to the first cleaning unit so as to make the first current smaller than the first predetermined value,
wherein the applying unit is configured to apply a voltage to the second cleaning unit,
wherein when the detected second current becomes equal to or greater than a second predetermined value, the controller controls the applying unit to reduce the voltage applied to the second cleaning unit so as to make the second current smaller than the second predetermined value,
wherein the applying unit adjusts the voltage applied to the first cleaning unit based on a first target voltage and adjusts the voltage applied to the second cleaning unit based on a second target voltage,
wherein the controller changes the first target voltage and the second target voltage to control the applying unit, and
wherein the warning unit issues one of the first and second warnings based on at least one of the first target voltage and the second target voltage.

8. The image forming apparatus according to claim 7, wherein at least one of the first detector and the second detector includes a photocoupler.

9. The image forming apparatus according to claim 7, wherein the first cleaning unit has:
a cleaning roller which is disposed to face the object and is configured to collect the particle deposited on the object;
a cleaning shaft which is configured to collect the particle collected by and deposited on the cleaning roller; and
a backup roller which is disposed at an opposite side to the cleaning roller with respect to the object,
wherein the applying unit applies a predetermined voltage between the cleaning shaft and the backup roller and adjusts a voltage between the cleaning roller and the backup roller by adjusting a voltage between the cleaning shaft and the cleaning roller, and
wherein the first detector detects the first current based on the voltage between the cleaning shaft and the cleaning roller.

10. The image forming apparatus according to claim 7, wherein the object includes a conveying belt which is configured to convey a recording sheet to which developer is transferred.

11. The image forming apparatus according to claim 7, wherein the controller controls the applying unit at least when the image forming apparatus is activated.

12. The image forming apparatus according to claim 7, wherein the controller controls the applying unit to increase the voltage applied to the first cleaning unit when the detected first current becomes smaller than a second predetermined value which is smaller than the first predetermined value.

13. A method for manufacturing the image forming apparatus according to claim 7, the method comprising:
assembling a plurality of components constituting the image forming apparatus;
measuring the first current flowing between the first cleaning unit and the object while applying the voltage to the first cleaning unit;
determining the first predetermined value based on the detected first current; and
storing the determined first predetermined value into a storage of the image forming apparatus.

* * * * *